United States Patent [19]

Albers et al.

[11] Patent Number: 5,146,978
[45] Date of Patent: Sep. 15, 1992

[54] METHOD AND APPARATUS FOR MONOCHANNEL SIMULTANEOUS HEAT AND MASS TRANSFER

[75] Inventors: Walter F. Albers, 2626 E. Arizona Biltmore Cir., #23, Phoenix, Ariz. 85016; James R. Beckman, Tempe, Ariz.

[73] Assignee: Walter F. Albers, Phoenix, Ariz.

[21] Appl. No.: 605,911

[22] Filed: Oct. 30, 1990

[51] Int. Cl.⁵ .............................. F28D 3/02; B01F 3/04
[52] U.S. Cl. ................................. 165/111; 165/115; 62/94; 62/271; 261/22; 261/23.1; 261/153
[58] Field of Search ............... 165/115, 111; 62/271, 62/121, 94, 92; 261/153, 22, 23.1

[56] References Cited

U.S. PATENT DOCUMENTS 2,017,027 10/1935 Forrest .................................. 62/271
4,287,721 9/1981 Robinson ............................. 62/271

Primary Examiner—Albert W. Davis, Jr.
Attorney, Agent, or Firm—William W. Holloway

[57] ABSTRACT

A method and apparatus for heat and mass transfer is described that is applicable to: regeneration of liquid desiccant solutions, heat pumping of humid gases, cooling and dehumidifying of gases for air conditioning, and water absorption from air. Generally, using a moving gas, at a constant pressure, a continual change in a vapor-liquid equilibrium is created between proximate but continually changing gas and liquid desiccant temperatures within an energy transferring chamber. Chamber wetting, implemented segmentedly, allows mass transfer into and from the moving gas. A forced temperature differential between heat sinks and sources causes heat transferred by means of thermally conductive barriers. Concurrent with temperature variances, the segmented wetting further allows liquid desiccant concentrations caused by evaporation or condensation, to vary between wetted sectors. A migratory movement connecting these wetted sectors provides for development of applicable concentration gradients between the wetted sectors along the chamber length.

5 Claims, 1 Drawing Sheet

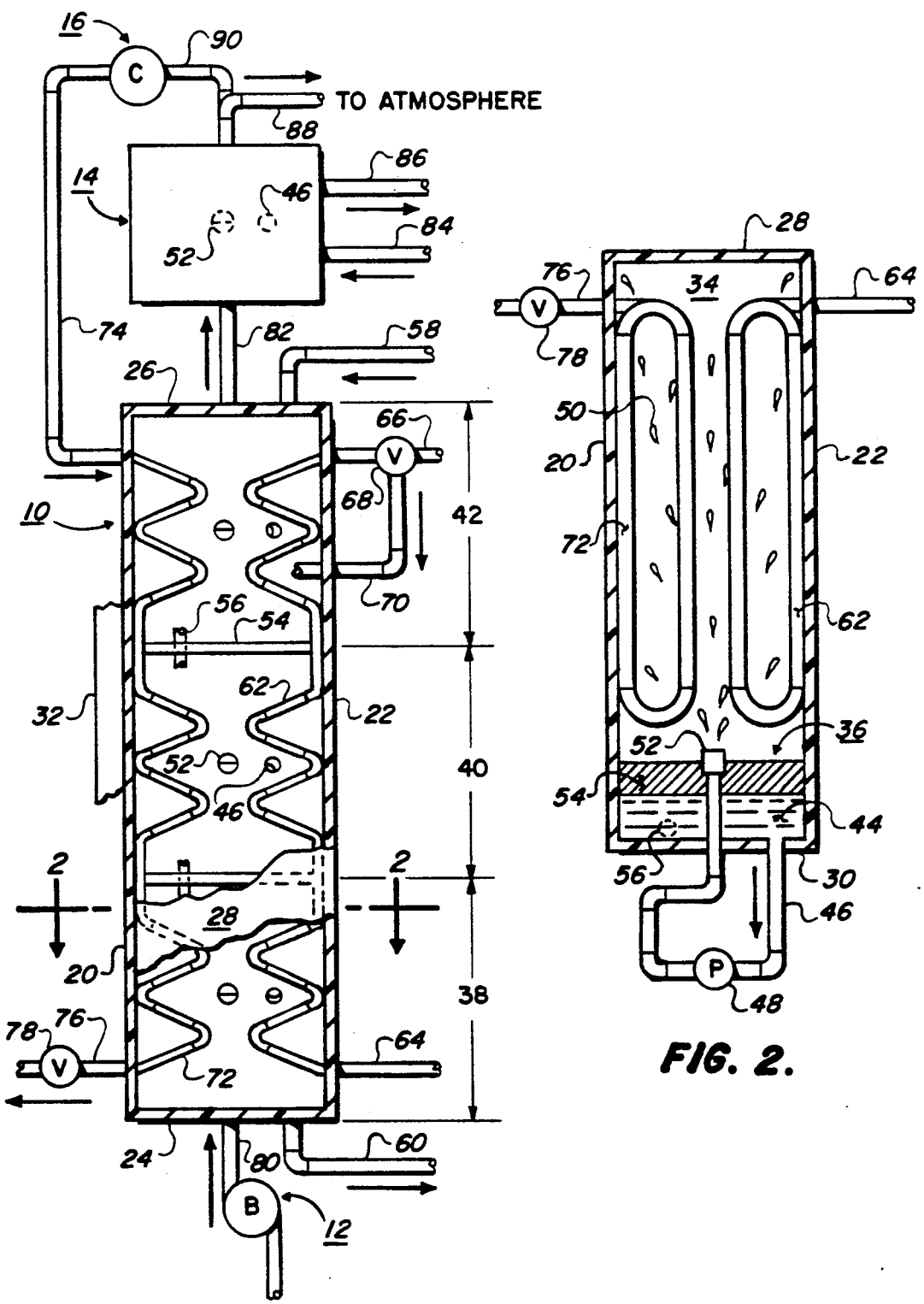

METHOD AND APPARATUS FOR MONOCHANNEL SIMULTANEOUS HEAT AND MASS TRANSFER

BACKGROUND OF THE INVENTION

1. Field of the Invention

The present invention relates to a method of heat transfer and mass transfer. As used herein, heat transfer is the movement of energy that heats or cools a fluid (liquid or gas) or evaporates a liquid or condenses a vapor that must exchange through a gas/liquid, gas/solid, or liquid/solid interface or combinations thereof. Mass transfer is the movement of an evaporating liquid from the liquid phase into the gas phase or movement of the condensing vapor from the gas phase into the liquid phase.

2. Description of the Related Art

In U.S. Pat. No. 4,832,115, entitled Method and Apparatus for Simultaneous Heat and Mass Transfer, issued on May 23, 1989, and invented by the inventors of the instant invention; the use of segmented wetting of sectors of at least one chamber by a fluid in a chamber through which a gas is flowing and migratory movement of the fluid through the sectors of the chamber by the fluid in a configuration involving at least two chambers with a thermally conducting wall therebetween has been described. The referenced U.S. Patent provides a multiplicity of applications in which simultaneous heat and mass transfer can be used advantageously, e.g., temperature and humidity modification, purification, etc.

While the use of two thermally connected chambers has provided a suitable environment for the implementation of the transfer, this structure has provided increased complexity in fabrication, particularly when the dimensions of the chamber become critical. A need has therefore been felt for apparatus to implement simultaneous heat and mass transfer which involves a single chamber.

FEATURES OF THE INVENTION

It is an object of the present invention to provide an improved method and apparatus for simultaneous heat and mass transfer.

It is a feature of the present invention to provide a method and apparatus for simultaneous heat and mass transfer which involves the flow of gas through a single chamber.

It is another feature of the present invention to provide a improved method and apparatus for heat and mass transfer in which a gas passes through a chamber having sections wetted by a fluid in the chamber exhibiting migratory movement.

It is yet another feature of the present invention to provide an improved method and apparatus for simultaneous heat and mass transfer in which at least one conduit having a thermally conducting surface extending through the chamber provides a thermally active element for the process.

SUMMARY OF THE INVENTION

The aforementioned and other features are attained, according to the present invention through the use of a gas which is generally defined as a noncondensing vapor or gas and in most cases is ambient air. This gas generally flows through a chamber which is thermally connected to a heat sink and in one case a heat source. Thermally connected, in this context, means that fluids (gas or liquid) from a chamber are brought into close proximity of a heat transferring barrier so that heat can transfer from a chamber to a sink or from a source to a chamber. In its passage, the gas generally operates under nearly constant pressure with pressure changed caused by frictional losses. The heat sources and sinks being of different temperature than the gas in the chamber cause a temperature and absolute humidity change to be created in the gas from one end of the chamber to the other. These changes cause the gases to approach a vapor-liquid equilibrium value and be thus receptive to receiving or losing vapors. Equilibrium value is a vapor-liquid equilibrium concentration or temperature. A vapor-liquid equilibrium can be said to exist when the escape tendency of the specie from liquid to a vapor phase is exactly balanced with the escape phase at the same temperature and pressure.

A wetting desiccant, which is a liquid, is applied to part or to all of a chamber. A liquid desiccant is a hydroscopic liquid such as lithium chloride (LiCl), lithium bromide (LiBr) or calcium chloride ($CaCl_2$). This wetting application is segmented, which means: (1) that the chamber is segmented along, its length into sequential sectors that may be equal or unequal in width; (2) that uncontrolled mixing of the wetting desiccant is minimized between sectors; (3) that the wetted sectors of the chamber are sequentially ordered so that heat transfer to and from the chamber will occur in a manner so as to continually change the temperatures of the segmented wetting desiccant in one direction along the chamber length; and (4) that while wetting a sector, which also includes its heat exchanging barrier, the bulk of the wetting desiccant remains within a sector a required time duration for: (a) its temperature to follow the temperature of the gas within that sector and/or the temperature of a heat sink or source thermally connected to the chamber sector and/or the temperature of the gas thermally connected to that chamber sector; and (b) a predetermined level of evaporation or condensation to occur into or from any present gas stream as induced by the vapor-liquid equilibrium imbalance associated with the gas and the wetting desiccant.

Migratory movement of the wetting desiccant for a plurality of sectors is provided. This migratory movement means: (1) the actual movement of the wetting desiccant into and out of a sector where the wetting desiccant when exiting a wetted sector has a temperature and concentration that is different than the temperature and concentration when the wetting desiccant entered the wetted sector; and (2) that some portion of the wetting desiccant of a wetting sector exists that sector to enter an adjacent wetting sector. This migratory movement between sectors allows a wetting desiccant temperature and composition of one sector to influence the temperature and composition of an adjacent sector, this sequence being repeated throughout a plurality of wetted sectors obtaining at least one overall directional movement of these wetting desiccants combined with sequential changes in temperature and composition. Migratory movement rate is controlled by addition to or subtraction from the chamber wetting desiccant by any means causing the required time duration of the wetting desiccant within a wetting sector to be achieved.

In operation, where there is evaporation from the wetting desiccant into the gas stream or selective condensation from this gas stream, segmented wetting coupled with migratory movement provide the following occurrences. First, as a sector is wetted by primarily the same wetting desiccant, the now localized wetting desiccant temperature and composition can be forced to change. Second, as the migratory movement is from one sector to another, the concentration of one sector influences the wetting desiccant composition of the subsequent sector where it again may be altered by evaporation or condensation, In this manner, selected desiccant property gradients ca be developed and maintained throughout the chamber length.

The apparatus for carrying out the invention consists of a chamber and heat sink which generally is found throughout the chamber length. A gas is moved into the chamber by mechanical means which can be a low pressure blower. Multiple liquid segmentations generally caused by segregated pumping and distribution means are provided. This distribution generally encompasses wetting of the heat sink barrier, but may further include wetting methods to increase chamber gas and wetting desiccant contact area, for example, the use of droplet sprays. The number of segmentations is sufficient to allow the wetting desiccant temperature to approach the temperatures of the passing gas proximate thereto and also present any significant concentration variances developed within the wetting desiccant. Provision for migration movement of the wetting desiccant in most cases from sector to sector over the length of the chamber can normally be by basins contained within the chamber. The apparatus can further incorporate a heat source, also generally placed throughout the chamber length, which provides heat to the chamber by heat transfer into the chamber. Heat for the heat source may be provided by compression of the gases leaving the chamber. The chamber, heat sink, and heat source are thermally connected by heat conducting barriers. The barriers, usually the wall of a plastic or metal pipe, provide a common heat transfer boundary with the chamber. The fluid within the heat sink is a liquid desiccant and the fluid in the heat source is a vapor laden gas capable of condensation.

The invention can be presented in terms of heat transfer and mass and energy balances. The conduction of energies between the chamber and the heat sources and sinks always involves sensible heat and, generally, at least one latent heat transfer related to evaporation or condensation. Sensible heat is that heat required to change the temperature of a liquid desiccant without changing the state of the liquid desiccant. Latent heat is that heat required to evaporate water from or condense water into a liquid desiccant without change of temperature or pressure.

A basic heat transfer is established by the heat exchange to and from the gas as this gas passes through the chamber. This change is caused by temperature differences between chamber gas and liquid and heat sink and heat source. Generally, the heat source is hotter than the chamber gas and liquid while the heat sink is cooler thus allowing heat transfer into and out of the chamber.

Basic energy and mass balance can be applied to the chamber gas. This balance relates the enthalpy of the incoming gas (its temperature and humidity content) plus conducting heat to and from sinks and sources to the exiting enthalpy of chamber gas. The difference in humidity content of the gas from chamber incoming to exiting dictates water input to or removal from the liquid desiccant within the chamber. The liquid desiccant has minimal effect in adjusting the enthalpy of the chamber gas. In most cases the liquid desiccant first flows through a heat sink prior to becoming chamber liquid thereby self canceling temperature shifting that might occur in the desiccant. In the case of remote air conditioning, any temperature differences in the liquid desiccant from chamber entrance to exit are essentially inconsequential in affecting the enthalpy of the chamber gas.

In most applications the heat sink is required to minimize chamber gas enthalpy effects due to desiccant temperatures. However, in the case of remote air conditioning, the heat absorbed by the heat sink, which might contain a fluid such as cold water or oil, equates to enthalpy reduction of the chamber gas as the gas passes through the chamber. The chamber gas is caused to reduce humidity content due to water adsorption by liquid desiccant migrating countercurrently to the chamber gas.

The application in which both a heat sink and a heat source is required is liquid desiccant regeneration. The enthalpy of inlet chamber gas (low in both temperature and humidity) is increased by energy transferred from the hotter heat source to the chamber gas. Both temperature and humidity of the chamber gas are caused to increase. The gas humidity increases by evaporation of water from migrating liquid desiccant in the chamber which had passed initially through the heat sink. The gas exits the chamber in a high temperature and high humidity state (increased enthalpy) and is compressed to a pressure so that when cooling becomes saturated with water vapor at a temperature higher than the temperature of the gas exiting the chamber. The compressed saturated gas is then used as the heat source fluid. As the compressed gas moves through the heat source, it cools and condenses water vapor giving its sensible and latent heat to the chamber gas where heating and evaporation is occurring. The enthalpy gain of the chamber gas is essentially equal to the enthalpy loss of the compressed gas. Upon exiting the heat source, the compressed gas is relieved of pressure and can be either recycled as chamber gas or exhausted.

These and other features of the present invention will be understood upon reading of the following description along with the drawings.

BRIEF DESCRIPTION OF THE DRAWINGS

FIG. 1 is a plan view of the apparatus for monochannel heat and mass transfer according to the present invention including cutaway sections and showing an auxiliary water evaporator, a supplemental gas compressor, and gas movement; and FIG. 2 is a schematic cross-sectional view of the apparatus of FIG. 1 taken along line 2—2.

DESCRIPTION OF THE PREFERRED EMBODIMENT

1. Detailed Description of the Figures

Referring to FIGS. 1 and 2, a device of the present invention is shown and generally indicated by the numeral 10 along with gas movement unit 12, auxiliary water evaporator 14, and supplemental gas compressor 16. Device 10 is shown as a rectangular parallelepiped having side walls 20 and 22, end walls 24 and 26, top wall 28 and bottom wall 30 with these walls, which may be of plastics or corrosion resistant metals, optionally covered with insulation 32. The side walls are generally oriented vertically or nearly so although units with horizontal or inclined orientation as well as with curved surfaces or shapes or varying dimensions can be acceptable. The length of chamber 34 normally ranges from under 2 to 12 meters and from less than 1 meter in height to a limit largely dictated by material availability of between 2 and 3 meters. Width of chamber 34 is shown somewhat disproportionately in the drawings for clarity, the chambers previously constructed have widths varying from 3 mm to 15 cm, although other widths may be used. The container displayed as basin 36 is utilized for liquids present in chamber 34.

Chamber 34 is wetted in a manner to allow temperature variances of the wetting liquids and composition difference within these wetting liquids to be developed and maintained along the chamber length. The preferred wetting is segmented and relies upon division of the chamber length into many sectors, indicated here as three sectors by the numerals 38, 40, and 42, where mixing of liquids between these sectors does not occur to any appreciable extent. Wetting within each sector may be accomplished by various means. For example, liquid 44 can be removed from basin 36 via pipe shown generally by the numeral 46 and returned to chamber 34 via pump 48 where it is sprayed a droplets 50 into chamber 34 through distribution means 52 which is shown here as a spray nozzle. A plurality of these pumping and distribution apparati having their basin discharge pipes 46 located in sectors 38, 40, and 42 and centered within these sectors, for example, may provide full chamber wetting but maintain liquid temperature and applicable concentration integrity through the length of basin 36. Sector wetting can also include means located below top wall 28 such as downward directed spray devices or weirs. Sector liquid segmentation may be enhanced by incorporation of dams 44 between sectors, and in some cases spray isolators may be employed above dams 54 to the top of the chamber to further reduce sector liquid mixing. Flow of liquid 44 within basin 36 is possible owing to flow tubes 56 placed in dams 54. For example, migratory movement from inlet at pipe 58 to discharge at pipe 60 may transpire, thus causing migratory flow between sectors 38, 40, and 42.

Heat sink 62 is any device that removes heat from gases or liquids present in chamber 34. In a preferred embodiment a pipe containing a flowing liquid acts as the heat sink and is shown as a coil in FIGS. 1 and 2, wherein the wall of heat sink 62 serves as a barrier between heat sink 62 and chamber 34 while providing a common heat transfer boundary. In other configurations the coil may be spiraled vertically in each sector 38, 40, or 42 or may be wall 22 made to transfer heat into a heat sink affixed thereto. The flow of liquid to heat sink 62 may be via pipe 64 with exit from basin 36 by means of pipe 66 or it may be redirected into basin 36 by means of valve 68 and pipe 70. In other operating modes entry into heat sink 62 may be through pipe 66 with exit from basin 36 through pipe 64. In its flow through chamber 34 the liquid temperature increases with absorbed heat as it passes from sector to sector. Alternatively, heat sink 62 may contain a boiling fluid wherein its temperature remains below the temperature of sectors 38, 40, and 42.

Heat source 72 is an device that contributes heat into gases and liquids of chamber 34 and its preferred and alternate embodiments follow those for heat sink 62 and its wall also provides a barrier between heat source 72 and chamber 34 while serving as a common heat transfer boundary. In operation pressurized and thereby heated air enters heat source 72 via pipe 74 and exits chamber 34 through pipe 76 passing through regulator valve 78 which alternatively may be other types of flow constructors such as an orifice plate or turbine. Heat source 72 functions by giving heat energy to the sectors of chamber 34 as its temperature is above that of each sector approximate thereto. Heat is released from heat source 72 by the cooling of gases and the condensation of vapors that entered heat source 72 by means of pipe 74.

Materials for heat sink 62 and heat source 72 are preferably pipes or tubes selected from the group of plastics, metals, inorganic glasses or their combinations. In higher pressure applications and in cases where the pressures are significantly dissimilar, more sturdy material would be employed. The surface area of heat sink 62 and heat source 72 may be enhanced for instance, by utilization of rough textured materials.

Referring to FIG. 1, means for moving gas through chamber 34 is identified as gas movement unit 12 which is appended to device 10 by duct 80. While gas movement unit 12 is shown before device 10, location can be at other points in the gas path. Gas movement unit 12 may be a fan, blower or other type that delivers either a constant or pulsating gas movement. Further gas movement can exist within the chamber where this movement is in directions other than from one chamber end to the other. This movement can include natural or forced convection currents caused by liquid spray within the gas space for example, or by separate fans of low friction loss.

Referring now to FIGS. 1 and 2, means for cooling outlet gas from device 10 can be by auxiliary water evaporator 14 shown connected to device 10 by duct 82. Wetting the gas stream within auxiliary water evaporator 14 may be by evaporator pads or by liquid spray into the gas space. The spray may be in a like manner as found in device 10 including outlet pipe 46, pump 48 and spray nozzle 52. Water enters auxiliary water evaporator 14 by pipe 84 and mineral accumulation is avoided by allowing a smaller volume of water to exit through pipe 86.

Referring again to FIG. 1, in most cases gas leaving device 10 or auxiliary water evaporator 14 exits to the environment by means of duct 88. In special applications the gas is recycled to chamber 34 while incorporating a rise in its temperature. In one method the gas flows through duct 90 where the gas is compressed by supplemental gas compressor 16 thereby gaining in temperature. Shaft power of supplemental gas compressor can be by electric motor or gas fired engine or turbine. The gas continues under pressure in duct 74 and heat source 72 with pressure released by valve 78.

2. Description of the Preferred Embodiment

Remote Air Conditioning

The invention is partially directed toward a method of remote air conditioning such as in split systems of commercial buildings and homes. In these systems a separation is found between the remote unit which may be located in building duct work or affixed to walls or ceilings and a water cooler and a liquid desiccant regenerator which might be located external to the building. Looking to FIGS. 1 and 2, cooling water from a water cooler flows through heat sink 62 to remove heat from an air stream moving through chamber 34 as supplied by gas movement unit 12. Typically the cooling water might enter heat sink 62 by pipe 66 at 15° C., absorb heat, and exit heat sink 62 via pipe 64 at 21° C. and return to a water cooler. Air might enter chamber 34 at 27° C. and 50 % relative humidity and pass sequentially from sector 38 to 39, and then to 40 and exit chamber 34 at a reduced energy state such as 26° C. and 20% relative humidity. Energy removed from the air stream passes into heat sink 62. Moisture removed from air flowing through chamber 34 would be absorbed by a liquid desiccant of sufficient concentration to reduce the relative humidity of air. In operation, liquid desiccant from a desiccant regenerator enters basin 36 via pipe 58. In sector 42 this liquid desiccant is caused to spray into the air stream and wet heat sink 62 assisting moisture removal from the air and promoting heat transfer from sector 42 to heat sink 62. Liquid desiccant then migrates through flow tubes 56 to sector 40 and to sector 38 containing more water but still capable of reducing the different relative humidities of the air stream as the air stream passes through each sector. The liquid desiccant now containing absorbed water exits basin 36 through pipe 60 and may be returned to a liquid desiccant regenerator. Air exiting chamber 34 may remain at a low relative humidity state or may pas through auxiliary water evaporator 14 via duct 82 for partial or complete saturation which, for example, would allow an air condition of 13° C. and 100% relative humidity. Water used for this air humidification can be supplied by pipe 84 while pipe 86 can provide a water discharge from auxiliary water evaporator 14. Supply to pipe 84 may be from a water cooler, water exiting pipe 64 or other convenient source.

Dehumidifying, Heat Pumping, and Vapor Absorbing Alternatively device 10 can be directed to the removal of water vapor from a gas using a liquid desiccant. Three applications are identified as a result of this desiccant/vapor interaction; (1) dehumidification by drying a gas due to vapor removal, (2) heating a gas because of heat release upon vapor removal and, (3) vapor absorption applied, for example, to water accumulation by the desiccant from a ga coupled with subsequent removal of water by regeneration of the liquid desiccant.

For all above mentioned applications and referring to FIGS. 1 and 2, concentrated desiccant from a desiccant regenerator enters heat sink 62 by pipe 64 at 38° C. for instance The desiccant increases in temperature during movement through heat sink 62. The desiccant then flows through valve 68 and into basin 36 by pipe 70, and with desiccant present in basin 44 performs segmented wetting within sector 42. The desiccant then migrates through sectors 40 and 38 sequentially cooling and gaining water through contact with gas in chamber 34 until exiting by pipe 60 at perhaps 41° C. and returning to a desiccant regenerator. A gas, normally air, at 32° C. and 60% relative humidity, for example, is moved by gas movement unit 12 into chamber 34. In sector 38 this gas contacts the liquid desiccant distributed in the gas space and wetting heat sink 62 causing water vapor to leave the gas and enter the liquid and also assisting heat transfer into heat sink 62. Simultaneously the gas temperature increases due to release of condensation heat. After approaching a gas/liquid equilibrium, the gas moves sequentially from sector to sector continuing to dehydrate and warm interacting with the countercurrently migrating liquid desiccant. In sector 42, gas temperature is not substantially decreased by initial contact with entering desiccant as the desiccant temperature approaches the gas temperature owing to heating while in heat sink 62. Gas exits chamber 34 via duct 82, for example at 54° and 10% relative humidity. Device 10 performed as a dehumidifier as, at the conditions above presented, gas vapor content was reduced to about one-half of its original content by dehumidification. Since the gas increased in temperature, device 10 can be looked upon as a heat pump. Finally, since the liquid desiccant increased in water content caused by gas dehydration, device 10 performed as a vapor absorber where, in the example given, some portion of the water may be collected in a desiccant regenerator.

Liquid Desiccant Regeneratin

In another application, device 10 operates as a liquid desiccant regenerator wherein a gas is caused to heat resulting in evaporation of water from the desiccant. The gas is then compressed in pressure so that, when upon cooling, its water vapor begins to condense at temperatures greater than those of the evaporation process so that condensation energy is reused for evaporation.

Looking at FIGS. 1 and 2, gas is supplied to sector 38 at 43° C. and 10% relative humidity, for example by gas movement unit 12 and exposed to liquid desiccant spray from distributor means 52. Water evaporates into the gas with heat supplied by heat source 72. The gas moves progressively from sector to sector gaining in heat and moisture and exits chamber 34 by duct 82 at, for instance, 125° C. and 30% relative humidity. The gas, flowing next through duct 90, is compressed by supplemental gas compressor 16. The now pressurized and high temperature gas/vapor mixture of perhaps 246° C. moves through duct 74 into heat source 72. In sector 42, this gas/vapor mixture cools and condenses to about 127° C. giving up some of its heat to the gas and liquid desiccant sprays. The gas/vapor mixture further cools and condenses as its moves in heat source 72 through sectors 40 and 38 and exits chamber 34 to the atmosphere by duct 76 and valve 78 giving then a gas stream and a water stream at 49° C. In an alternative configuration, the gas, under slight pressure can be flowed to duct 80 eliminating need for a separate gas movement unit 12.

Desiccant to be regenerated is preheated, entering heat sink 62 by pipe 64 at 37° C., for example. In sector 38 this fluid increases in temperature since temperatures of heat source 72 and liquids and gases in sector 38 are greater. After gaining heat, the fluid flows in heat sink 68 sequentially through sectors 40 and 42 further heating in like manner to perhaps 120° C. and by means of valve 68 and pipe 70 enters basin 36. In sector 42, this basin liquid 44 is distributed in the gas space through distribution means 52 forming spray droplets 50 which allow intimate gas/liquid contact and enhanced heat and mass transfer coefficients on heat source 72 and heat sink 62. This allows evaporation of water from liquid desiccant into the gas vapor mixture in sector 42 partially regenerating the liquid desiccant of basin 36. Energy needed for this evaporation is supplied by the cooling of gas and vapor condensation in heat source 72. After sufficient evaporation, basin liquid 44 moves in migratory flow to sector 40 providing again for partial regeneration and thence to sector 38 where complete desiccant regeneration is affected, and the desiccant exits basin 36 by pipe 60.

The foregoing description is included to illustrate the operation of the preferred embodiment and is not meant to limit the scope of the invention. The scope of the invention is to limited only by the following claims. From the foregoing description, many variations will be apparent to those skilled in the art that would yet be encompassed by the spirit and scope of the invention.

What is claimed is:

1. Apparatus for changing the temperature and composition of a wetting desiccant, said apparatus comprising:
    a chamber containing a plurality of sectors;
    a wetting means for segmentedly wetting a plurality of said sectors with said wetting desiccant;
    migration means coupled to said wetting means for providing a migratory movement for said wetting desiccant between adjacent sectors;
    a heat sink within said chamber, said heat sink having a liquid flowing therethrough;
    a heat transferring barrier thermally connecting said chamber and said heat sink;
    a fluid flow means controlling a wetting desiccant flow through said heat sink;
    a gas flow means controlling a flow of a gas through said chamber wherein a temperature of said gas and a temperature of said liquid result in transfer of heat between said chamber and said heat sink through said heat transferring barrier, wherein temperatures of said wetting desiccant are below a boiling temperature for said wetting desiccant during wetting, wherein interaction in said sectors between said wetting desiccant and said gas causes a change in the temperature and composition of said wetting desiccant, said gas approaching a vapor-liquid equilibrium with said wetting desiccant for each of said wetted sectors, wherein interaction by said wetting desiccant and said migratory movement causes said temperature and composition of said wetting desiccant in an adjacent sector and a temperature of said liquid to change while passing through said chamber.

2. Apparatus for changing a temperature and a composition of a wetting desiccant of claim 1 further comprising distribution means whereby said liquid flow is selected to be said wetting desiccant.

3. Apparatus for changing a temperature and a composition of a wetting desiccant of claim 1 further comprising a heat source, said heat source providing a vapor laden gas, wherein said vapor laden gas condenses thereby transferring heat to said sectors of said chamber.

4. Apparatus of claim 3 further comprising compression means for compressing said gas leaving said chamber and applying said compressed gas to said heat source 5. Apparatus for removing water from a liquid desiccant, said apparatus comprising:
    a chamber divided into a plurality of sectors;
    a liquid desiccant distribution means for distributing liquid desiccant in each of said plurality of sectors;
    a migratory flow means for causing a migratory movement of said liquid desiccant between sectors;
    a heat sink thermally connecting said sectors and having said liquid desiccant flowing therethrough;
    a heat source thermally connecting said sectors and having a flow of gas therethrough;
    a gas movement means for causing a flow of gas in said chamber cocurrent with movement of said liquid desiccant in said heat sink; and
    a gas compression means associated with said chamber, wherein said liquid desiccant exits from said heat sink and enters said sectors to flow in said migratory movement countercurrent to said gas flow, said gas leaving said chamber being then compressed to a higher pressure and temperature before returning through said chamber in said heat source;
    said gas in said chamber gaining in heat and moisture in each sector and approaching a gas/liquid equilibrium in each sector with said liquid desiccant, said migratory movement of said liquid desiccant between said sectors allowing a temperature and composition of said liquid desiccant in one sector to influence a temperature and composition of said liquid desiccant in an adjacent sector, said liquid desiccant and said gas receiving sensible heat and heat for evaporation by heat transfer from said heat source, said gas and said liquid desiccant also transferring heat into said heat sink, wherein condensation of vapor in said heat source and an increase in temperature of said heat sink liquid results from heat transfer.

* * * * *